Patented Dec. 1, 1953

2,661,348

UNITED STATES PATENT OFFICE 2,661,348

PROCESS FOR PREPARING POLYSILOXANE RESINS

Charles E. Welsh and Norman G. Holdstock, Schenectady, N. Y., assignor to General Electric Company, a corporation of New York No Drawing. Application February 8, 1951, Serial No. 210,094

7 Claims. (Cl. 260—46.5)

The present invention relates to novel polysiloxane resins and to a method of preparing such resins. More particularly, it is concerned with an improved process of hydrolyzing organohalogenosilanes to obtain improved polysiloxane resinous products having a hydrocarbon-to-silicon ratio greater than 1 and less than 2. In particular, the invention relates to a process of preparing a polysiloxane resin which comprises hydrolyzing an organohalogenosilane composition with a mixture comprising (a) water and (b) a liquid which is a solvent for the organohalogenosilane and the formed organopolysiloxane, the said solvent having a specific gravity above 1.1 and preferably above 1.2, a boiling point below 175° C., and being inert to hydrogen halide and inert to the aforesaid halogenosilane and the formed organopolysiloxane, and thereafter removing the lower non-aqueous layer containing the polysiloxane resin.

One specific embodiment of our invention includes the process of preparing a polysiloxane resin which comprises (1) forming a solution of a composition comprising an organotrihalogenosilane in a liquid halogenated organic solvent inert to hydrogen halide and inert to the aforesaid halogenosilane and the formed organopolysiloxane, and having a specific gravity above 1.1, preferably above 1.2 and having a boiling point below 175° C., preferably below 150° C., (2) adding the said solution to water in an amount at least sufficient and preferably in excess of that required for complete hydrolysis of the organotrihalogenosilane, and (3) removing the lower non-aqueous layer containing the polysiloxane resin.

It is well known that organohalogenosilanes or mixtures thereof which may also contain some silicon tetrahalide, readily hydrolyze when mixed with water to form silanols which condense or can be caused to condense to form polysiloxanes. The ease with which the silanols condense is dependent on the nature of the silicon-bonded organic radicals. When all or substantially all of these radicals are methyl groups, the rate of dehydration or condensation is so rapid that for all practical purposes the condensation of the silanols occurs simultaneously with the hydrolysis of the chlorosilanes. Because both reactions occur instantaneously, the hydrolysis of methyl chlorosilanes containing a sufficient number of chlorine atoms attached to silicon to form heat-hardenable products by mixing them with water, results in the formation of insoluble gels which cannot be used in the manufacture of useful resinous compositions, or in the formation of products of low average molecular weight rather than the high average molecular weight products sought in the preparation of resinous products in general.

Various methods have been devised for controlling the hydrolysis reaction and the earlier attempts along this line had for their principal object the prevention of gel formations during hydrolysis. One such method comprises hydrolyzing organohalogenosilanes by first dissolving the organohalogenosilane in ether and adding the resulting solution to ice or a mixture of ice and water. Another process disclosed in Sauer Patent 2,398,672 issued April 16, 1946, comprised forming a solution of the organohalogenosilane in a solvent such as toluene and the addition of this solution to a mixture comprising water and a higher alcohol such as butanol. A still further method as exemplified, for example, in Lamoreaux Patent 2,483,209, involved the addition of chlorosilanes or a solution thereof to a certain mixture of an inert solvent and water. However, all the foregoing methods had disadvantages in the process. Thus, the ether solvent method involved a serious fire hazard and also could not be applied satisfactorily to blends of organohalogenosilanes containing appreciable quantities of organotrihalogenosilanes, for example, methyltrichlorosilane. The Sauer method, although used extensively, nevertheless introduced a reactive solvent which frequently was difficult to remove from the resin and also required large volumes of expensive solvents. Finally, all the foregoing solvents used in the processes described above are lighter than water and involve fire hazards and in some cases toxicity hazards as well as high costs, not only in initial use but in recovery. In many instances it was difficult to separate the solvents from the resin when such was desired. When the hydrocarbon solvents are used the resin solutions emulsify quite readily during the washing operation, and are in general very difficult to wash free of acid.

We have now discovered that the use of a high gravity inert solvent in a heterogeneous hydrolysis system results in a simplified preparation with many advantages. More particularly, we have discovered that we are able to obtain solutions of organopolysiloxanes free, or substantially free, of water and substantially free of any emulsification by first forming a solution of an organohalogenosilane or a mixture of organohalogenosilanes including the latter organotrihalogenosilane (for brevity hereinafter the word "organohalogenosilane" will refer to an individual organotrihalogenosilane or mixture of organohalogenosilanes containing an organotrihalogenosilane in a liquid halogenated organic solvent inert to the aforesaid halogenosilane, and having a specific gravity above 1.1 and a boiling point below 175° C., and thereafter adding the solution to a hydrolysis medium consisting essentially of water in an amount which is preferably in excess of that required for complete hydrolysis of all the silicon-bonded halogens. By means of our invention it is possible to avoid the formation of emulsions which ordinarily form and in this way a significant saving in time is realized since the resin does not usually have to be washed.

Moreover, the efficiency of any washing is increased since fewer washes are required to reduce the acid number to a safe value. In many instances, no washing whatsoever is necessary since the initial hydrolysis step results in a resin in solution of a very low acid number. Also, the formation of gel particles during hydrolysis is greatly minimized, thus again simplifying both the washing and the filtration of the resin. In addition, by means of our invention, we are able to use organohalogenosilane mixtures in which as high as 60 mol per cent of the organohalogenosilanes in the mixture comprises an organotrihalogenosilane specifically methyltrichlorosilane.

In the practice of our invention it is essential that there is employed a halogenated organic compound which is water-non-reactive and which is inert to the hydrogen halide formed during hydrolysis, to the organohalogenosilane and to the formed organopolysiloxane. In addition, it is necessary that this halogenated compound which is a solvent for both the organohalogenosilane and the organopolysiloxane, should be liquid, for example, at room temperature, and should have a boiling point preferably below 175° C., in order to permit easy volatilization of the halogenated compound when it is desired to do so either to recover the resin per se or to volatilize the solvent from any surface coated with the resin solution. Furthermore, the specific gravity of the halogenated organic compound should be above 1.1, and preferably above 1.2. Such specific gravities permit the formation of solutions of the formed resin during hydrolysis which will constitute a lower phase with the aqueous phase. It has been found that the liberated hydrogen halide, e. g., HCl, will be concentrated in the upper aqueous phase and little if any of the resulting hydrogen halide will appear in the formed polysiloxane resin. As a further advantage of the halogenated organic compound having the specific gravity above 1.1 is the fact that by means of such solvent and rapid separation of the resin solution, it is possible to conduct the hydrolysis on a substantially continuous basis whereby as fast as the resin solution is formed it can be readily withdrawn. At the same time, the solution of the halogenated organic compound and the organohalogenosilane is continually added to the water of hydrolysis, or simultaneously added with the water of hydrolysis to a common reaction vessel.

Among the halogenated organic compounds (for brevity, these compounds will hereinafter be referred to as "halogenated compound") which may be employed in the practice of this invention may be mentioned, for instance, halogenated aliphatic compounds, for example, trichloroethylene, tetrachloroethane, tetrachloroethylene, carbon tetrachloride, trichloroethane, ethyl bromide, dichloropropane - 1,3, dibromodichloromethane, dichloropropylene, dibromobutane - 2,3, 1,2 - dibromo - 2 - methylpropane, 1-bromo-2,2-difluoroethane, 1,2-dibromo-2,2-difluoroethane, etc.; trichlorobromoethane, trichlorobromomethane, 1,1,1 - trichloroethane, acetylene tetrachloride, etc.; dichloroiodomethane, chlorobenzene, bromobenzene, meta-dichlorobenzene, bromocyclohexane, etc.

The organohalogenosilane subjected to hydrolysis conditions may be any one of those corresponding to the general formula: $R_nSiX_{4-n}$ wherein R represents a monovalent hydrocarbon radical, X represents a halogen atom, specifically, a chlorine or bromine atom, and $n$ is a whole number and is equal to at least 1 and not more than 3.

Illustrative examples of radicals from which R may be chosen are, for instance, alkyl (e. g., methyl, ethyl, propyl, butyl, etc.); cycloaliphatic (e. g., cyclopentyl, cyclopentenyl, cyclohexyl, cychlohexenyl, cycloheptyl, etc.); aryl (e. g., phenyl, diphenyl, naphthyl, tetrahydronaphthyl, anthracyl, etc.); alkaryl, including both mono and polyalkylphenyl, mono- and polyalkylnaphthyl, etc., radicals (e. g., tolyl, xylyl, tripropylphenyl, etc.); aralkyl (e. g., benzyl, phenylethyl, etc.); unsaturated aliphatic radicals (e. g., vinyl, allyl, methallyl, etc.); and their homologues as well as those groupings wherein one or more of the hydrogen atoms have been replaced by a suitable substituent group, for example, a halogen (chlorine, bromine, etc.).

It will, of course, be apparent that instead of using single organohalogenosilanes, mixtures of organohalogenosilanes corresponding to the general formula mentioned above and organohalogenosilanes having the formula $R'R''SiX_2$ and $R''_3SiX$ where R', R'', and R''' have the same meaning as R and X is a halogen, for example, mixtures of methylchlorosilanes, for example, dimethyldichlorosilane and methyltrichlorosilane, or mixtures of methylchlorosilanes and phenylchlorosilanes, for example, methyltrichlorosilane, dimethyldichlorosilane, and phenyltrichlorosilane, etc., may also be used without departing from the scope of the invention. In general, we prefer that the ratio of organic groups to silicon atoms in the organohalogenosilane or mixtures of organohalogenosilane be within the range of from about 1 to 2, preferably within the narrower range of from 1.2 to 1.8. Also, we have found it desirable that the molar concentration of the organotrihalogenosilane is preferably from about 10 to 100 mol per cent of the total molar concentration of the organohalogenosilanes. If methyltrihalogenosilanes are employed, it has been found in some instances advantageous to maintain the molar concentration thereof below 60 mol per cent.

The ratio of halogenated compound to organohalogenosilane may be varied at will. It is preferred that the halogenated compound, which is a solvent both for the organohalogenosilane and for the formed organopolysiloxane, be present in a sufficient amount to give a usable solution of the organohalogenosilane and also sufficient to act as a solvent for all the formed organopolysiloxane. In general, we have found that on a weight basis, we may employ from about 0.5 to 2 or more parts of the halogenated compound per part of the hydrolyzable organohalogenosilane. It will, of course, be apparent to those skilled in the art that this ratio may be varied within wide limits depending on the dilution desired of the silane and, of course, the concentration or solids content of the organopolysiloxane solution. In many instances it is possible by the first step of adding the organohalogenosilane solution to the water to obtain a lower phase of a solution containing the organopolysiloxane in any desired concentration of resin, depending upon the initial concentration of the halogenated compound in the organohalogenosilane solution. If the ratio of halogenated compound to organohalogenosilane is high, the ratio of halogenated compound solvent to resin formed will be high and, of course, the converse will be true.

In addition to using the many halogenated compounds listed above by themselves for forming the solution of organohalogenosilanes, we have found that we can use other water-insoluble non-halogenated liquid, relatively inert solvents (i. e., for the organohalogenosilanes and polysiloxanes) with the halogenated compounds wherein these other solvents are in a minor proportion and are not present in too large amounts so as to depress the specific gravity of the mixture below 1.1 and preferably not below 1.2. Thus, we may use, for instance, up to 10 to 15 per cent, by weight, based on the total weight of the halogenated and non-halogenated solvent, of such materials as xylene, toluene, diethyl ether, diethyl ether of ethylene glycol, hexane, cyclohexane, etc. It will be apparent that the per cent of the non-halogenated compound may be varied depending on the per cent thereof required to maintain the desired specific gravity. Inert, liquid, water-insoluble halogenated compounds, having specific gravities below those of the preferred halogenated compounds may also be used in combination with the high gravity halogenated compounds observing the precautions mentioned above as regards the specific gravity of the combined mixture of solvents.

The amount of water used in carrying out the hydrolysis is preferably present in an amount sufficient to effect essentially complete hydrolysis of all the silicon-bonded halogen atoms. This should, of course, take into account the fact that as the first silanol formation takes place, one silanol group may condense with another silanol group to split out water which, in turn, can be used to hydrolyze a silicon-bonded halogen. It is therefore apparent that all the water necessary for hydrolysis of the silicon-bonded halogen need not necessarily be added originally but advantage may be taken of the splitting out of water during the condensation reaction between silanols to use these molecules of water for further hydrolysis purposes. In general, it has been found advantageous to use excesses of water above that required for complete hydrolysis of the organohalogenosilane. In this respect it has been found advantageous to use weight ratios of from about 3 to 10 parts of water per part of organohalogenosilane. If too little water is employed excessive gel formation may result. Such gel formations also may occur if the acid concentration in the water layer during hydrolysis becomes too high. This is one of the main reasons which recommends larger proportions of water. The amount of water used will depend on the number of hydrolyzable groups and the nature of the silicon-bonded organic groups. Thus higher organic group to silicon ratios will require less water than when lower ratios are found in the hydrolyzable organohalogenosilane.

In practicing our invention, one preferred procedure is to form a solution of the hydrolyzable composition containing the organohalogenosilane with the halogenated compound. Thereafter, this solution is added to the water of hydrolysis. It has been found advantageous to conduct the hydrolysis at a temperature at least slightly above room temperature, for example, at temperatures ranging from about 35° to 75° C. By means of this higher temperature we have found that the resins produced in accordance with our process have a superior shelf life due, probably, to the more advanced state of condensation of the resin. After addition of the organohalogenosilane solution to the water, it will be found that two layers will separate out, an upper layer comprising the water and essentially all the hydrogen halide formed during the reaction, and a lower layer, which is heavier than the water, which will comprise the halogenated compound in the form of a solution with the organopolysiloxane. Because of the high gravity of the solvent, this solution will separate quite readily from the water and in subsequent washing operations, if they are necessary, this fact will assist in readily separating the washed resin, again in the form of a solution, from such wash waters. No emulsions will form as is often the case in washing silicone resins dissolved in solvents approaching the gravity of water or having a specific gravity below water. This, of course, is a significant saving in time. Moreover, the efficiency of the washing is increased because fewer washings are required to reduce the acid number to very low values.

An alternative procedure comprises adding the organohalogenosilane to a mixture of the water of hydrolysis and the halogenated compound. If desired, small portions of the halogenated compound may be employed to dilute the organohalogenosilane prior to addition thereof to the mixture of water and halogenated compound.

After separation of the lower resin layer, the halogenated compound solvent may be stripped from the resin by conventional distillation by heating to a temperature at which the solvent, that is, the halogenated compound, readily distils. Thereafter, preferably while still hot, another solvent which is to remain permanently in the resin solution, for example, xylene, toluene, butanol, etc., may then be added to the resin and the resulting solution heated to reflux to give a solution of the resin in whatever concentration is desired, depending on the amount of solvent added.

In order that those skilled in the art may better understand how the present invention may be practiced, the following examples are given by way of illustration and not by way of limitation. All parts are by weight.

EXAMPLE 1

A blend of organohalogenosilanes was prepared so that there were present 40 mol per cent methyltrichlorosilane, 30 mol per cent phenyltrichlorosilane, and 30 mol per cent dimethyldichlorosilane. About 500 grams of the above blend was added to a reaction vessel equipped with a stirrer, a reflux condenser and an inlet tube for the chlorosilane mixture, the said reaction vessel containing a well-stirred mixture of 2500 cc. of water and 400 cc. of trichloroethylene. The chlorosilane blend was added to the stirred mixture in the flask over a period of about 12 minutes during which time the temperature of the hydrolysis medium rose from 18° C. to 62° C. After the addition of the chlorosilanes was completed, the mixture was stirred for an additional five minutes and the layers were allowed to separate, the resinous layer sinking to the bottom and the aqueous acid layer floating at the top. The resin layer was drawn off and washed three times with 500 cc. portions of water until the cure on a 200° C. hot plate was over 5 minutes. The resin was then stripped of the trichloroethylene and diluted to 60 per cent solids with xylene and filtered.

EXAMPLE 2

Two hundred grams of a blend of 20 mol per cent methyltrichlorosilane, 40 mol per cent dimethyldichlorosilane, and 40 mol per cent phenyltrichlorosilane was added to a reaction vessel containing a well-stirred mixture of 1000 cc. water and 160 cc. chlorobenzene. The chlorosilane blend was added to the stirred mixture during a period of about 8 minutes. After additional stirring for 5 minutes, the resinous layer which sank to the bottom was separated, washed three times with water and stripped of the chlorobenzene and then diluted to 60% solids with xylene. This solution could be used for dipping glass cloth or tape for insulating purposes and could be heat-cured to a hard, thermoset coated product of improved resistance to oils and greases.

EXAMPLE 3

A blend of organohalogenosilanes ($R/Si=1.4$) was prepared by mixing together 20 mol per cent methyltrichlorosilane, 40 mol per cent phenyltrichlorosilane, 20 mol per cent dimethyldichlorosilane, and 20 mol per cent diphenyldichlorosilane. A solution of 500 grams of this chlorosilane blend was made with 750 grams of trichloroethylene. This solution was added to a reaction vessel equipped with a mechanically powered stirrer and in which was present 2000 grams of water. The addition was made at about 35° C. and the solvent-silane blend was added slowly through an inlet tube which dipped well below the surface of the water. The total addition time was 22 minutes, during which time the temperature of the hydrolysis mixture rose to 72° C. Stirring was continued for an additional 5 minutes and thereafter the mixture was allowed to separate. A sample of the lower resin-trichloroethylene layer was withdrawn and titration with KOH gave an acid number of 1.1 mg. KOH/gm. This indicated that it was not necessary to wash the resin layer further since the acid number was below that necessary for a stable resin. The trichloroethylene was stripped by conventional distillation from the resin solution by heating the solution to a pot temperature of 150° C. At this point 130 grams of xylene was added to the resin and the resulting solution was heated to gentle reflux for one hour. After filtering, the solution was adjusted to 60 per cent resin solids by adding the required amount of xylene. This resin showed superiority over resins having the same R/Si ratio made by other methods known previously in the art, especially with regard to having improved hardness at high temperatures and improved resistance to gasoline, oils, and greases. These superior properties are gained, in part, by the faster through cure exhibited by the particular resins when catalyzed with heavy metal organic salts, such as zinc octoate.

EXAMPLE 4

In this example 540 grams of phenyltrichlorosilane ($R/Si=1$) was mixed with 750 grams trichloroethylene and this blend was added to 2000 grams of water over a period of 15 minutes. The initial and final temperatures were 45° C. and 76° C., respectively. After separation the resin was finished in the manner described in Example 3 and adjusted to 60 per cent solids in toluene. The product was a water-white liquid of a viscosity of approximately 8 cps. at 25° C. A 3-mil film on glass was dry in air in a few minutes at room temperature, leaving a hard, brittle resin film.

EXAMPLE 5

A blend of organohalogenosilanes ($R/Si=1.2$) was prepared by mixing together 20 mol per cent methyltrichlorosilane, 60 mol per cent phenyltrichlorosilane, and 20 mol per cent dimethyldichlorosilane. Five hundred grams of this blend was mixed with 750 grams of trichloroethylene and added slowly to 2000 grams of water over a period of 40 minutes. The initial and final temperatures were 35° C. and 68° C., respectively. The lower layer was separated and the resin was recovered by distilling off the halogenated solvent to a pot temperature of 160° C. When adjusted to 60 per cent solids in toluene, the product was a nearly water-white liquid with a viscosity of approximately 8 cps. at 25° C.

EXAMPLE 6

A blend of organohalogenosilanes was prepared by mixing together 40 mol per cent methyltrichlorosilane, 30 mol per cent phenyltrichlorosilane, and 30 mol per cent dimethyldichlorosilane ($R/Si=1.3$). Five hundred six grams of this blend was added to 293 grams of trichloroethylene and this mixture was added slowly over a period of 18 minutes to a well-stirred mixture of 293 grams of trichloroethylene and 2500 grams of water. After separation of the resin layer, it was found that the resin had a cure at 200° C. of 41 seconds. The resin was washed five times with 500 cc. portions of water and after the last wash the resin had a cure of 109 seconds. About 200 grams xylene was added to the resin layer and this mixture was distilled to a pot temperature of 140° C. This permitted the removal of the trichloroethylene (boiling point 88° C.) without taking the resin to dryness. After adjusting the resin to 60 per cent solids in xylene, the product was a pale yellow liquid with a viscosity of approximately 12 cps. at 25° C. When catalyzed with zinc octoate and baked for 1 hour at 200° C., this resin cured to an extremely hard, brittle polymer.

EXAMPLE 7

Twenty mol per cent methyltrichlorosilane, forty mol per cent phenyltrichlorosilane, and forty mol per cent dimethyldichlorosilane ($R/Si=1.4$) were formed into a blend and 500 grams of this blend was added to 750 grams of trichloroethylene and the solution was added with stirring to 2000 grams of water over a period of 20 minutes. The initial temperature was 34° C. and the final temperature was 72° C. After separation of the resin layer, the solvent was removed by distillation up to a pot temperature of 150° C. at which point 130 grams of xylene was added and the resultant solution heated at reflux for an additional hour. The resin was filtered and adjusted to 60 per cent solids in xylene. The product was a clear, pale yellow liquid with a viscosity of approximately 6 cps. at 25° C. When this resin was catalyzed with about 2 per cent, by weight zinc octoate, based on the weight of the resin, and cured for 1 hour at 200° C., it produced a clear film with excellent high temperature hardness and good mar resistance.

EXAMPLE 8

A blend (R/Si=1.5) of organohalogenosilane was prepared by mixing together 30 mol per cent methyltrichlorosilane, 20 mol per cent phenyltrichlorosilane, 30 mol per cent dimethyldichlorosilane, and 20 mol per cent diphenyldichlorosilane. Five hundred grams of the above blend of chlorosilanes was mixed with 750 grams of trichloroethylene and the whole mixture was added slowly to 2000 grams of water over a period of 20 minutes. The initial and final temperatures were 35° C. and 70° C., respectively. The resin layer was separated and the solvent was removed by distillation to a pot temperature of 160° C. Fifty grams of toluene was added and the resinuous solution was heated at reflux for 1 hour and thereafter filtered and the resin thereby obtained was adjusted to 80 per cent solids in toluene. About 260 grams of this resin solution (208 grams of solid) was placed in a reaction vessel equipped with a mechanically driven stirrer and a reflux condenser. About 13 grams of zinc octoate (8% zinc) was added to the resin solution and external heating was applied at the temperature of 132-138° C. for 5¾ hours. Thereafter more toluene was added to reduce the solids content to approximately 60 per cent. The resin solution thus obtained was filtered to give a product which was light yellow in color and had a viscosity of 140 cps. at 25° C. A strip of 3-mil glass cloth was dipped in the resin, allowed to drain thoroughly, and then heated for 10 minutes at 150° C. to remove the solvent. The strip was then heated at 250° C. for 15 minutes at the end of which time a dry resin film was obtained. The resin was very flexible and the strip could be bent around a very small diameter without cracking the film.

EXAMPLE 9

A blend (R/Si=1.7) of organochlorosilanes was prepared by mixing together 10 mol per cent methyltrichlorosilane, 20 mol per cent phenyltrichlorosilane, 40 mol per cent dimethyldichlorosilane, and 30 mol per cent diphenyldichlorosilane. Five hundred grams of this blend was mixed with 500 grams trichloroethylene and the solution was added to 1500 grams water over a period of 12 minutes during which time the initial and final hydrolysis temperatures were 38° C. and 71° C., respectively. After separation of the lower resin layer, the solvent was removed by distillation to a pot temperature of 150° C. and 60 grams of toluene was added and the resin solution again heated to reflux for a period of 30 minutes. The resin was then filtered and adjusted to 80 per cent solids in toluene. The product was a straw-colored liquid with a viscosity of about 50 cps. at 25° C. A film on 3-mil glass tape was dry in 30 minutes at 300° C. and the dry tape was very soft and flexible.

EXAMPLE 10

Twenty mol per cent ethyltrichlorosilane and eighty mol per cent phenyltrichlorosilane (R/Si=1.0) were mixed together and about 500 grams of this blend was mixed with 750 grams trichloroethylene and the solution added to 2000 grams of water over a period of 15 minutes. The initial and final hydrolysis temperatures were 33° C. and 70° C., respectively. After separation, the trichloroethylene was removed from the resin and the latter diluted with xylene in the same manner as shown in Example 3. The product was a clear, light, straw-colored liquid with a viscosity of less than 10 cps. at 25° C.

A similar resin was obtained having similar characteristics by using in place of the above ethyltrichlorosilane-phenyltrichlorosilane blend a blend comprising 50 mol per cent of ethyltrichlorosilane and 50 mol per cent phenyltrichlorosilane.

EXAMPLE 11

A blend of organochlorosilanes (R/Si=1.4) was prepared by mixing together 20 mol per cent ethyltrichlorosilane, 20 mol per cent methyltrichlorosilane, 20 mol per cent phenyltrichlorosilane, 20 mol per cent dimethyldichlorosilane, and 20 mol per cent diphenyldichlorosilane. About 500 grams of this blend was mixed with 750 grams trichloroethylene and the solution was added to 2000 grams of water over a period of 24 minutes. The initial and final hydrolysis temperatures were 34° C. and 71° C., respectively. The resin was finished in the same manner as described above in Example 3 to give a product which was a clear, light yellow, liquid having a viscosity of less than 10 cps. at 25° C.

EXAMPLE 12

A blend was prepared by mixing together 20 mol per cent allyltrichlorosilane, 40 mol per cent phenyl trichlorosilane and 40 mol per cent dimethyldichlorosilane (R/Si=1.4). Five hundred grams of this blend was mixed with 750 grams of trichloroethylene and the solution was added to 2000 grams of water over a period of 20 minutes. The initial and final temperatures were 36° C. and 74° C., respectively. After separation the resin was finished in the same manner as shown in Example 3 with the exception that toluene was added to make the final resin solution instead of xylene. The product was a clear, light-yellow liquid with a viscosity of less than 10 cps. at 25° C.

EXAMPLE 13

A chlorosilane blend (R/Si=1.4) was prepared by mixing together 20 mol per cent allyltrichlorosilane, 40 mol per cent phenyltrichlorosilane, 20 mol per cent dimethyldichlorosilane, and 20 mol per cent diphenyldichlorosilane. Five hundred grams of this blend was mixed together with 750 grams trichloroethylene and the solution thereby obtained was added to 2000 grams water over a period of 24 minutes. The initial and final hydrolysis temperatures were 31° C. and 70° C., respectively. After separation of the lower resin layer it was found that the acid number was 1.2 mg. KOH/gm. The yield of resin was 991 grams of solution at 32.2 per cent resin solids. About 491 grams of this resin solution was placed in a reaction vessel and distilled to a pot temperature of 180° C. The resin remaining in the reaction vessel was allowed to cool to about 100° C. and 150 grams monomeric styrene was added. The silicone resin was readily soluble in the styrene. After filtering the solution it was adjusted to 60 per cent silicone solids content by the addition of the appropriate amount of styrene. The product was a water-white liquid with a viscosity of approximately 6 cps. at 25° C. This composition could be readily applied in the form of a film and cured either with or without the incorporation of a vinyl polymerization cure accelerator, such as benzoyl peroxide.

Five hundred grams of the resin solution obtained from the hydrolysis above (Example 13)

was placed in a reaction vessel and distilled to a pot temperature of 180° C. At this point, 161 grams diallyl phthalate was added to dissolve the silicone resin. After filtering and cooling, the product was a light-yellow viscous liquid with a viscosity of about 180 cps. at 25° C. Thereafter, 10 grams of this latter product was placed in a small beaker and to it was added 10 grams additional diallyl phthalate, 15 grams styrene and 15 grams dipropylene glycol maleate. After thorough mixing a homogeneous solution was obtained. About 0.5 gram tertiary butyl perbenzoate was added to the polymerizable mass. This latter mixture was then heated at 60° C. for 2 hours, 80° C. for 2 hours, 100° C. for 1 hour, and 125° C. for 16 hours. The product thus obtained was a hard, clear, polymerized material and even after heating for 65 hours at 150° the sample did not lose its shape. When further heated at 180° C. for 16 days the polymerized sample was still transparent and showed neither crazing or cracking. This was evidence of a remarkable heat stability when it is noted that only a small per cent of the polymer was an organopolysiloxane.

EXAMPLE 14

In this example a blend of organochlorosilanes (R/Si=1.4) was prepared by mixing together 20 mol per cent vinyltrichlorosilane, 10 mol per cent methyltrichlorosilane, 30 mol per cent phenyltrichlorosilane, 20 mol per cent dimethyldichlorosilane, and 20 mol per cent diphenyldichlorosilane. One thousand grams of this blend was added to 1500 grams trichloroethylene and the solution was added to 4000 grams of well stirred water over a period of 20 minutes. The initial and final hydrolysis temperatures were 35° C. and 65° C., respectively. After separation of the lower resin layer, the resin was finished in the same manner as described above in Example 3 to give a product which was a clear, light-yellow liquid with a viscosity of about 7 cps. at 25° C.

Other vinyl resins, similar to that prepared in Example 14 above, may be made by varying the mol per cents in accordance with the desired properties of the resin. Thus, resins having the following molar concentrations in the starting chlorosilanes have been prepared successfully to give products having essentially the same properties as described for the resin in Example 14.

*Table I*

|  | Mol Percent in Blend | | | |
|---|---|---|---|---|
| Vinyltrichlorosilane | 10 | 30 | 10 | 20 |
| Methyltrichlorosilane |  |  | 10 |  |
| Phenyltrichlorosilane | 20 |  | 40 | 40 |
| Dimethyldichlorosilane | 40 | 40 | 20 | 20 |
| Diphenyldichlorosilane | 30 | 30 | 20 | 20 |

EXAMPLE 15

In this example 500 grams of the same chlorosilane blend described in Example 3 was mixed with 750 grams tetrachloroethane and this solution was added slowly to 2000 grams of water. The addition time was 21 minutes and the initial hydrolysis temperature was 36° C. and the final temperature 75° C. After agitation was stopped, the resin layer on the bottom was separated and found to have an acid number of 1.9 mg. KOH/gm. The solvent was then removed by distillation to a pot temperature of 198° C. and 130 grams of xylene was added to residue and the resulting resin solution heated to gentle reflux for 1 hour. The resin was filtered and adjusted to 60 per cent solids in xylene. The resulting product was very pale yellow in color and had a viscosity of approximately 7 cps. at 25° C. The resin exhibited properties almost identical with those described in Example 3.

EXAMPLE 16

The same blend as described in Example 3 in an amount equal to 500 grams was mixed with 750 grams tetrachloroethylene and this solution was added slowly to 2000 grams of water over a period of 23 minutes during which time the initial temperature was 35° C. and the final temperature was 76° C. After separation of the lower resin layer, it was finished in the same manner as described in Example 3 to give a product which was a light yellow liquid having a viscosity of 6 cps. at 25° C. and had essentially the same properties as that described for the resin in Example 3.

EXAMPLE 17

About 500 grams of the chlorosilane blend described in Example 7 was mixed with 750 grams carbon tetrachloride and this solution was hydrolyzed by adding it slowly to 2000 grams of water over a period of 20 minutes during which time the initial and final temperatures were 36° C. and 70° C., respectively. After separation of the lower resin layer, it was finished in the same manner as described in Example 3 and adjusted to 60 per cent solids in xylene. The product was a nearly water-white liquid with a viscosity of 6 cps. at 25° C.

EXAMPLE 18

Using the same blend of chlorosilane described in Example 7, 500 grams of this blend was mixed with 750 grams of trichloroethane and this solution was added slowly to 2000 grams of water over a period of 18 minutes. The lower resin layer which separated out was finished in the same manner as described in Example 3 and adjusted to 60 per cent solids in xylene. The product was a nearly water-white liquid with a viscosity of approximately 7 cps. at 25° C.

It will, of course, be apparent to those skilled in the art that instead of the halogenated compounds employed as solvents in the foregoing examples, other halogenated compounds, many examples of which have been given previously may also be used without departing from the scope of the invention. In addition, many other organohalogenosilanes or blends of organohalogenosilanes may also be employed, additional examples of organic groups attached to silicon by Si—C bonds being given earlier herein.

The examples above are indicative of the range of compositions, based on the nature of the substituents R and the ratio R/Si which may be employed in the practice of our invention. It will, of course, be apparent that many other R substituents may also be used and that also the ratio of ingredients may be varied considerably. It is desirable that in using a monomethyltrihalogenosilane the amount thereof should not exceed substantially 60 mol per cent since amounts in excess of this value lead to difficulty in separation and increase the danger of gel formation. However, it is to be understood that our process for hydrolyzing organohalogenosilanes permits higher molar concentrations of organotrihalogenosilanes than has heretofore been possible by any other previously known process.

The resins produced in accordance with our process can be heat-treated alone or with paint driers such as cobalt, zinc, and iron naphthenates to give films which are tough, heat-resistant and quite flexible. They are capable of withstanding elevated temperatures of 200° C.–250° C. for long periods of time without visible change. They have a superior shelf-life and craze resistance. In addition, they have one unique property which, as far as we are aware, is nowhere found in resins of a similar type prepared by other processes. More particularly, it has been found that unexpectedly the resins prepared in accordance with the above-described process are compatible merely by cold-blending with alkyd resins, for example, oil-modified alkyd resins, e. g., of the glyceryl-phthalate type, or non-oil-modified alkyd resins including unsaturated alkyd resins, for example, reaction products obtained by effecting reaction between a polyhydric alcohol, for example, ethylene glycol, diethylene glycol, propylene glycol, etc., and an alpha unsaturated alpha, beta polycarboxylic acid (or anhydride), for example, maleic acid or anhydride, fumaric acid or anhydride, itaconic acid, etc. Our invention permits mere cold-blending of the silicone resins with alkyd resins to give homogeneous, compatible compositions which when deposited in the form of a film are clear, tough, mar-resistant, and have good heat-stability despite even large concentrations of the alkyd resin. Such combinations as waterproofing agents for cement are more particularly disclosed and claimed in the copending Kennedy et al. application Serial No. 210,092, filed concurrently herewith and assigned to the same assignee as the present invention.

What we claim as new and desire to secure by Letters Patent of the United States is:

1. The process of preparing a polysiloxane resin from a mixture of hydrolyzable organochlorosilanes containing an average of from 1.2 to 1.8 hydrocarbon groups per silicon atom and comprising a dihydrocarbon dichlorosilane and a monohydrocarbon trichlorosilane in which there is at most 60 mol per cent methyltrichlorosilane based on the entire organochlorosilane content, which process comprises hydrolyzing the aforesaid mixture of chlorosilanes in an aqueous medium consisting of (a) water in excess of that required for complete hydrolysis of the silicon-bonded chlorines of the aforesaid organochlorosilane mixture, and (b) a non-aqueous phase having a specific gravity of at least 1.1 and consisting essentially of a liquid, water-non-reactive halogenated hydrocarbon having a specific gravity of at least 1.1 and a boiling point below 175° C. and being present, by weight, in amount equal to from 0.5 to 2 parts of the halogenated hydrocarbon per part of the organochlorosilane mixture.

2. The process of preparing a polysiloxane resin from a mixture of organochlorosilanes containing an average of from 1.2 to 1.8 total hydrocarbon groups per silicon atom and comprising dimethyldichlorosilane and phenyltrichlorosilane in which there is at most 60 mol per cent methyltrichlorosilane, which process comprises hydrolyzing the aforesaid mixture of chlorosilanes in an aqueous medium consisting of (a) water in excess of that required for complete hydrolysis of the silicon-bonded chlorines of the aforesaid organochlorosilane mixture and (b) a non-aqueous phase consisting essentially of trichloroethylene, the latter being present, by weight, in an amount equal to from 0.5 to 2 parts thereof per part of the organochlorosilane mixture.

3. The process of preparing a methyl phenyl polysiloxane resin containing an average of from 1.2 to 1.8 total methyl and phenyl groups per silicon atom by hydrolysis of hydrocarbon chlorosilanes in an aqueous medium consisting of water and trichloroethylene, which process comprises (1) forming a solution of (a) a mixture of organochlorosilanes comprising methyltrichlorosilane, phenyl trichlorosilane, and dimethyldichlorosilane, in which there is at most 60 mol per cent methyltrichlorosilane based on the entire organochlorosilane content, and (b) a liquid non-aqueous solvent for the aforesaid chlorosilanes having a specific gravity of at least 1.1 and consisting essentially of trichloroethylene, the latter being present, by weight, in an amount equal to from 0.5 to 2 parts thereof per part of the organochlorosilane mixture, (2) adding the said solution to water in excess of that required for complete hydrolysis of the silicon-bonded chlorines of the aforesaid organochlorosilane mixture and (3) removing the lower non-aqueous layer containing the methyl phenyl polysiloxane resin.

4. The process of preparing a polysiloxane resin from a mixture of organochlorosilanes containing an average of from 1.2 to 1.8 total hydrocarbon groups per silicon atom and comprising dimethyldichlorosilane, methyltrichlorosilane, and phenyltrichlorosilane in which there is at most 60 mol per cent methyltrichlorosilane, which process comprises hydrolyzing the aforesaid mixture of chlorosilanes in an aqueous medium consisting of (a) water in excess of that required for complete hydrolysis of the silicon-bonded chlorines of the aforesaid organochlorosilane mixture and (b) a non-aqueous phase consisting essentially of carbon tetrachloride, the latter being present, by weight, in an amount equal to from 0.5 to 2 parts thereof per part of the organochlorosilane mixture.

5. The process of preparing a polysiloxane resin from a mixture of organochlorosilanes containing an average of from 1.2 to 1.8 total hydrocarbon groups per silicon atom and comprising dimethyldichlorosilane, methyltrichlorosilane, and phenyltrichlorosilane in which there is at most 60 mol per cent methyltrichlorosilanes which process comprises hydrolyzing the aforesaid mixture of chlorosilanes in an aqueous medium consisting of (a) water in excess of that required for complete hydrolysis of the silicon-bonded chlorines of the aforesaid organochlorosilane mixture and (b) a non-aqueous phase consisting essentially of tetrachloroethane, the latter being present, by weight, in an amount equal to from 0.5 to 2 parts thereof per part of the organochlorosilane mixture.

6. The process of preparing a polysiloxane resin from a mixture of organochlorosilanes containing an average of from 1.2 to 1.8 total hydrocarbon groups per silicon atom and comprising dimethyldichlorosilane, methyltrichlorosilane, and phenyltrichlorosilane in which there is at most 60 mol per cent methyltrichlorosilane, which process comprises hydrolyzing the aforesaid mixture of chlorosilanes in an aqueous medium consisting of (a) water in excess of that required for complete hydrolysis of the silicon-bonded chlorines of the aforesaid organchlorosilane mixture and (b) a non-aqueous phase consisting essentially of tetrachloroethylene, the latter being present, by weight, in an amount equal to from 0.5 to 2 parts thereof per part of the organochlorosilane mixture.

7. The process of preparing a polysiloxane resin from a mixture of organochlorosilane containing on an average of from 1.2 to 1.8 total hydrocarbon groups per silicon atom and comprising dimethyldichlorosilane, methyltrichlorosilane, and phenyltrichlorosilane in which there is at most 60 mol per cent methyltrichlorosilane, which process comprises hydrolyzing the aforesaid mixture of chlorosilanes in an aqueous medium consisting of (a) water in excess of that required for complete hydrolysis of the silicon-bonded chlorines of the aforesaid organochlorosilane mixture and (b) a non-aqueous phase consisting essentially of trichloropropane, the latter being present, by weight, in an amount equal to from 0.5 to 2 parts thereof per part of the organochlorosilane mixture.

CHARLES E. WELSH.
NORMAN G. HOLDSTOCK.

References Cited in the file of this patent

UNITED STATES PATENTS

| Number | Name | Date |
| --- | --- | --- |
| 2,470,479 | Ferguson et al. | May 17, 1949 |
| 2,483,373 | Rochow | Sept. 27, 1949 |
| 2,521,678 | White et al. | Sept. 12, 1950 |
| 2,622,072 | Gordon | Dec. 16, 1952 |

OTHER REFERENCES

Jervis et al., The Chemical Age, August 9, 1947, vol. 57, pp. 187 and 188.